United States Patent
Lunsford et al.

(10) Patent No.: US 10,401,186 B2
(45) Date of Patent: Sep. 3, 2019

(54) NAVIGATION SYSTEM WITH TRAVEL INFORMATION DISPLAY MECHANISM AND METHOD OF OPERATION THEREOF

(71) Applicant: Telenav, Inc., Sunnyvale, CA (US)

(72) Inventors: Eric Michael Lunsford, San Carlos, CA (US); Salman Dhanani, Redmond, WA (US); Sambuddha Saha, San Francisco, CA (US)

(73) Assignee: Telenav, Inc., Santa Clara, CA (US)

( * ) Notice: Subject to any disclaimer, the term of this patent is extended or adjusted under 35 U.S.C. 154(b) by 62 days.

(21) Appl. No.: 14/048,336

(22) Filed: Oct. 8, 2013

(65) Prior Publication Data

US 2015/0100230 A1 Apr. 9, 2015

(51) Int. Cl.
*G01C 21/36* (2006.01)
*G01C 21/34* (2006.01)

(52) U.S. Cl.
CPC ..... *G01C 21/3676* (2013.01); *G01C 21/3407* (2013.01)

(58) Field of Classification Search
CPC .................. G01C 21/3676; G01C 21/3407
See application file for complete search history.

(56) References Cited

U.S. PATENT DOCUMENTS

| | | | | |
|---|---|---|---|---|
| 5,608,635 A | * | 3/1997 | Tamai | G01C 21/3461 340/990 |
| 6,826,472 B1 | * | 11/2004 | Kamei | G01C 21/3605 340/995.19 |
| 7,778,773 B2 | | 8/2010 | Yaqub et al. | |
| 2004/0140909 A1 | | 7/2004 | Meadows et al. | |
| 2007/0010942 A1 | | 1/2007 | Bill | |
| 2008/0103686 A1 | | 5/2008 | Alberth et al. | |
| 2008/0167802 A1 | * | 7/2008 | Yoshioka | G01C 21/3611 701/533 |
| 2010/0097240 A1 | | 4/2010 | Soulchin et al. | |
| 2010/0179756 A1 | | 7/2010 | Higgins et al. | |
| 2010/0262362 A1 | * | 10/2010 | Naito | G01C 21/343 701/424 |
| 2010/0268460 A1 | * | 10/2010 | Wan et al. | 701/210 |
| 2010/0312466 A1 | * | 12/2010 | Katzer et al. | 701/201 |
| 2011/0035142 A1 | | 2/2011 | Tang | |
| 2011/0106436 A1 | | 5/2011 | Bill | |
| 2012/0059584 A1 | * | 3/2012 | Nesbitt et al. | 701/527 |

FOREIGN PATENT DOCUMENTS

| | | | | |
|---|---|---|---|---|
| JP | 2003057049 A | * | 2/2003 | |
| JP | 2012207940 A | * | 10/2012 | |

* cited by examiner

*Primary Examiner* — Jelani A Smith
*Assistant Examiner* — Kelly D Williams
(74) *Attorney, Agent, or Firm* — Perspectives Law Group, Corp.

(57) ABSTRACT

A method of operation of a navigation system includes: determining a designated location for estimating travel information; generating a travel information A for traveling from an designated location to a destination A; generating a travel information B for traveling from the designated location to a destination B; and presenting the travel information A and the travel information B concurrently based on a display priority for displaying on a device.

20 Claims, 6 Drawing Sheets

NAVIGATION SYSTEM WITH TRAVEL INFORMATION DISPLAY MECHANISM AND METHOD OF OPERATION THEREOF

TECHNICAL FIELD

The present invention relates generally to a navigation system, and more particularly to a system for display of travel information.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a display of the travel information has become a paramount concern for the consumer. Inadequate display of the travel information decreases the benefit of using the tool.

Thus, a need still remains for a navigation system with travel information display mechanism. In view of the ever-increasing commercial competitive pressures, along with growing consumer expectations and the diminishing opportunities for meaningful product differentiation in the marketplace, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a designated location for estimating travel information; generating a travel information A for traveling from the designated location to a destination A; generating a travel information B for traveling from the designated location to a destination B; and presenting the travel information A and the travel information B concurrently based on a display priority for displaying on a device.

The present invention provides a navigation system, including: an origin determinator module for determining a designated location; a trip A module, coupled to the origin determinator module, for generating a travel information A for traveling from the designated location to a destination A; a trip B module, coupled to the origin determinator module, for generating a travel information B for traveling from the designated location to a destination B; and a display module, coupled to the trip A module, for presenting the travel information A and the travel information B concurrently based on a display priority for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
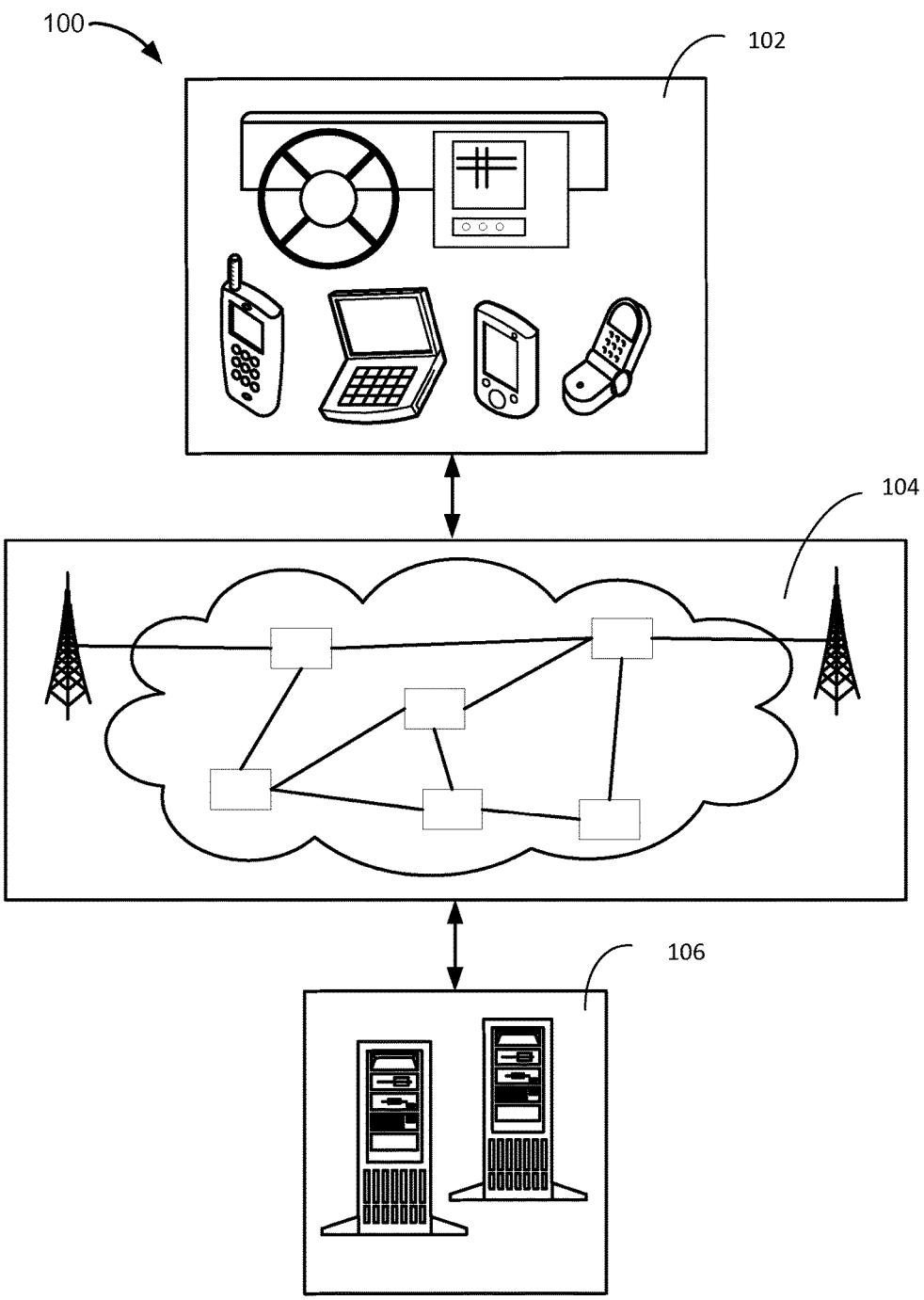
FIG. 1 is a navigation system with travel information display mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with travel information display mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
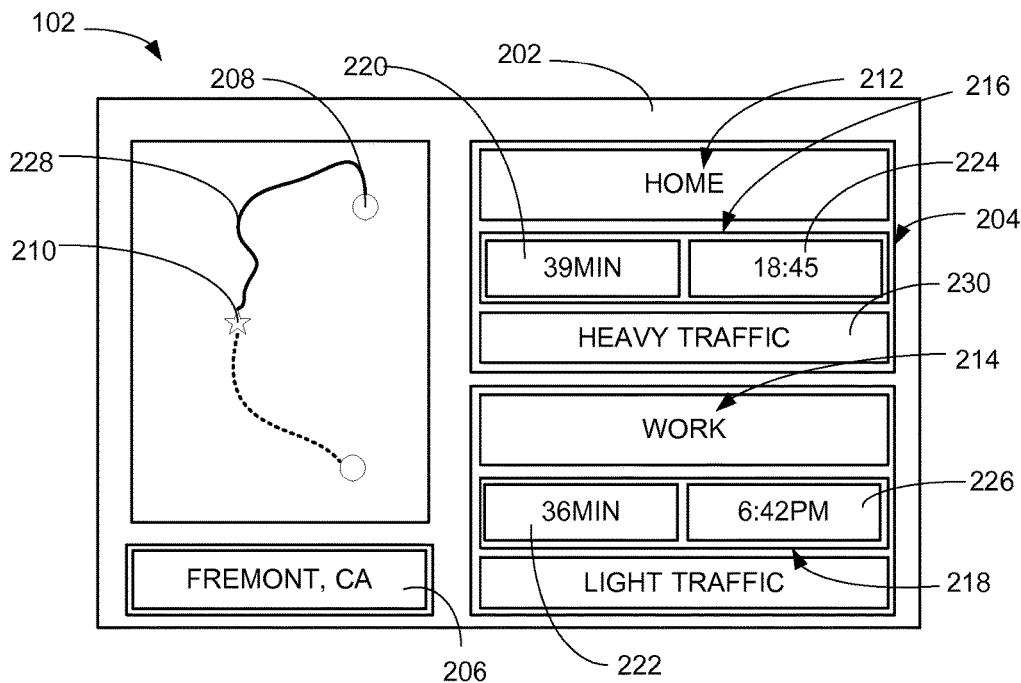
FIG. 2 is a first example of a presentation of travel information displayed on the first device.

Referring now to FIG. 2, therein is shown a first example of a presentation 202 of travel information 204 displayed on the first device 102. For brevity, the discussion of the navigation system 100 will be described as the first device 102 displaying the result generated by the navigation system 100. However, the second device 106 of FIG. 1 and the first device 102 can be discussed interchangeably.

The presentation 202 is defined as the arrangement of information displayed on the first device 102. Examples of the arrangement of the information will be discussed later The travel information 204 can include an estimation of time related information for traveling from one geographic location to another geographic location. For example, the travel information 204 can include an estimation of time related information for traveling from a designated location 206 to a target destination 208.

The designated location 206 is defined as the starting geographic location for calculating the travel information 204. The target destination 208 is defined as the end point for calculating the travel information 204.

The designated location 206 can include a current location 210, which is defined as the current physical location of the first device 102. The target destination 208 can include a destination A 212 and a destination B 214. The destination A 212 and the destination B 214 are defined as possible end points for calculating the travel information 204. For example, the destination A 212 and the destination B 214 can represent geographic locations that are different from each other. For a specific example, the destination A 212 can represent "home" and the destination B 214 can represent "work."

The travel information 204 can include a travel information A 216 and a travel information B 218. The travel information A 216 can include an estimation of time related information for traveling from the designated location 206 to the destination A 212. The travel information B 218 can include an estimation of time related information for traveling from the designated location 206 to the destination B 214. For example, the travel information A 216 can be calculated for the travel from the current location 210 to the destination A 212. For another example, the travel information B 218 can be calculated for the travel from the current location 210 to the destination B 214. In this example, the travel information A 216 and the travel information B 218 can be generated from the same geographic location of the current location 210.

The travel information A 216 can include a travel time A 220 and an estimated arrival time A 224. The travel time A 220 is defined as an estimation of time duration required to travel from the designated location 206 to the destination A 212. The estimated arrival time A 224 is defined as an estimation of the time that the first device 102 will arrive at the destination A 212 for traveling from the designated location 206. For example, the travel time A 220 from the current location 210 to "home" can be 39 minutes. For another example, the estimated arrival time A from the current location 210 to "home" can be 18:45.

The travel information B 218 can include a travel time B 222 and an estimated arrival time B 226. The travel time B 222 is defined as an estimation of time duration required to travel from the designated location 206 to the destination B 214. The estimated arrival time B 226 is defined as an estimation of the time that the first device 102 will arrive at the destination B 214 for traveling from the designated location 206. For example, the travel time B 222 from the current location 210 to "home" can be 36 minutes. For another example, the estimated arrival time B from the current location 210 to "home" can be 6:42 PM.

A user of the navigation system 100 can select the travel information 204 on the first device 102 for the navigation system 100 to generate a travel route 228 from the designated location 206 to the target destination 208. The travel route 228 is defined as a path to reach the target destination 208.

A display interface of the first device 102 can represent a touchscreen. For example, the user can make a selection directly on the presentation 202 shown on the display interface. More specifically, the designation B 214 can represent a button for the user to select for the navigation system 100 to generate the travel route 228 to the destination B 214. For specific example, if the user selects the travel information A 216 of the presentation 202, the navigation system 100 can generate the travel route 228 from the current location 210 to the destination A 212.

For example, the presentation 202 can include the name of the destination A 212, the travel time A 220, and the estimated arrival time A 224 displayed on the first device 102. For another example, the estimated arrival time A 224 can be displayed as 24 hour clock while the estimated arrival time B 226 can be displayed with AM/PM clock. For further example, the presentation 202 can include audio output of the destination A 212, the travel time A 220, and the estimated arrival time A 224 by the first device 102.

For further example, the presentation 202 can display traffic information 230. The traffic information 230 can include a traffic condition, such as a flow of the traffic, for a route in a geographic location where the designated location 206, the current location 210, the target destination 208, or a combination thereof can locate. For example, the traffic information 230 can include the traffic condition from the current location 210 to the target destination 208. For another example, the traffic information 230 can include the traffic condition for traffic for specific highway, such as Interstate 280, a highway in California.

For further example, the traffic condition of the travel route 228 can be displayed with different colors. For example, the color red can indicate heavy traffic along the travel route 228 while the color green can indicate light traffic. The presentation 202 of the travel information 204 can be changed for customizing the travel information 204 displayed on the first device 102. Details regarding the customization will be discussed later.

Figure 3:
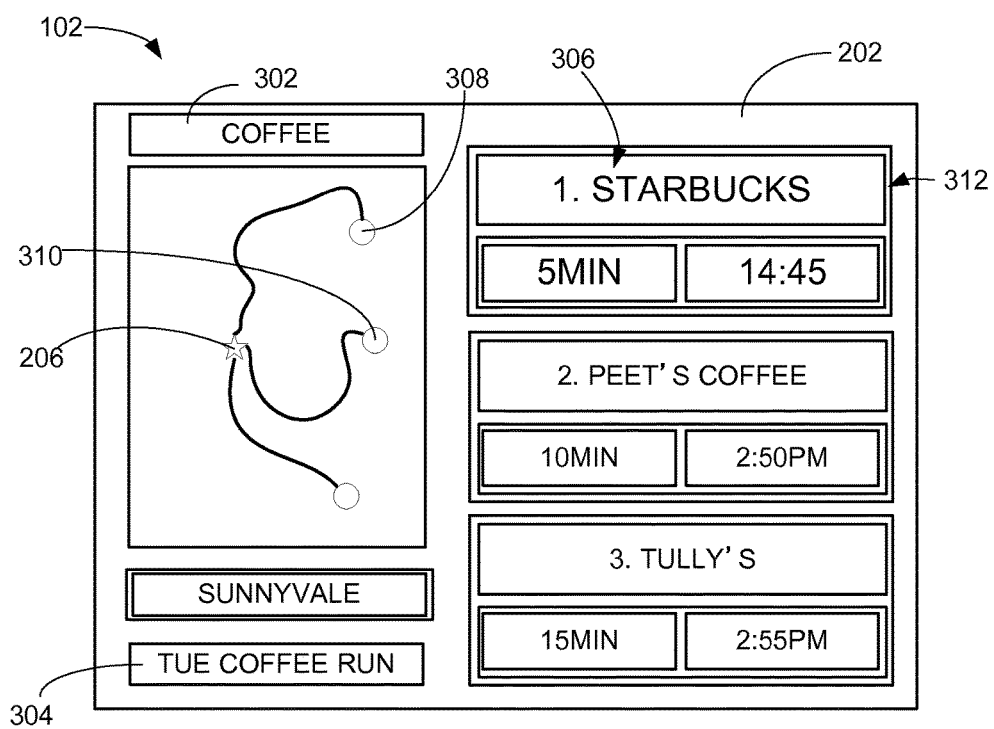
FIG. 3 is a second example of the presentation of the travel information of FIG. 2 displayed on the first device.

Referring now to FIG. 3, therein is shown a second example of the presentation 202 of the travel information 204 of FIG. 2 displayed on the first device 102. The presentation 202 can include the travel information 204 for traveling from the designated location 206 to a registered destination 308, an unregistered destination 310, or a combination thereof.

The registered destination 308 is defined as the target destination 208 of FIG. 2 registered to the navigation system 100. For example, the registered destination 308 can include the destination A 212 of FIG. 2 registered by the user. For a specific example, the registered destination 308 can represent Peet's Coffee™, an American brand coffee shop. The user can change the registered destination 308. For example, the user can change the registered destination 308 from Peet's Coffee™ to Starbucks Coffee™, another American brand coffee shop.

For further example, the travel information 204 to the registered destination 308 can represent an estimation of the time related information requested by the user to reach the target destination 208. The travel information A 216 of FIG. 2 to Peet's Coffee™ can be requested or specifically desired by the user, because the user had registered Peet's Coffee™ to the navigation system 100.

The unregistered destination 310 is defined as the target destination 208 suggested by the navigation system 100 for displaying on the first device 102. For example, the unregistered destination 310 can include the destination B 214 of FIG. 2. For a specific example, the unregistered destination 310 can represent Starbucks Coffee™, an American brand coffee shop. For further example, the travel information B 218 of FIG. 2 can represent an unrequested travel information 312, which is defined as the travel information 204 to the unregistered destination 310.

More specifically, the unrequested travel information 312 can represent the travel information 204 suggested by the navigation system 100 and which was not specifically desired by the user. For this example, the presentation 202 can include the travel information 204 to the registered destination 308 and the unregistered destination 310. For a different example, the presentation 202 can include the travel information 204 to multiple numbers of the registered destination 308 only or to multiple numbers of the unregistered destination 310 only. Details regarding the navigation system 100 suggesting the travel information 204 will be discussed later.

A category of interest 302 is defined as a classification of attractions. For example, the category of interest 302 can include coffee, grocery shopping, restaurants, or wine tasting. For this example, the presentation 202 can be customized to only show the travel information 204 that is related to the category of interest 302 of coffee. Details regarding the customization will be discussed later.

A travel history 304 can include the past activity by the user of the navigation system 100. For example, the travel history 304 can show that the user with the first device 102 frequents to the coffee shops in the geographic region of Sunnyvale, Calif. (CA) on every Tuesday afternoons. Moreover, the navigation system 100 can forecast the travel information 204 based on extrapolating the travel history 304. Details regarding the forecasting of the travel information 204 will be discussed later.

A display priority 306 is defined as the prioritization of how the travel information 204 will be presented on the first device 102. For example, the display priority 306 can be based on the travel information 204, the category of interest 302, the travel history 304, or a combination thereof. Details regarding the navigation system 100 factoring the display priority 306 for customizing the presentation 202 will be discussed later.

For example, the travel information A 216 to the destination A 212 can have a higher priority to be displayed on the first device 102 than the travel information B 218. As a result, the travel information A 216 can be displayed with a bigger font, different color, or a combination thereof on the first device 102 than the travel information B 218.

For another example, the travel information 204 to Starbucks Coffee™ can be displayed above the travel information for Peet's Coffee or Tully's Coffee, an American brand coffee shop, because the display priority 306 is based on the shortest travel time to the target destination 208. For example, the travel time A 220 of FIG. 2 can represent 5 minutes to Starbucks Coffee™ while the travel time B 222 of FIG. 2 can represent 10 minutes to Peet's Coffee™. The travel time A 220 can be presented first and above the travel time B 222, because the travel time A 220 is shorter duration than the travel time B 222.

Figure 4:
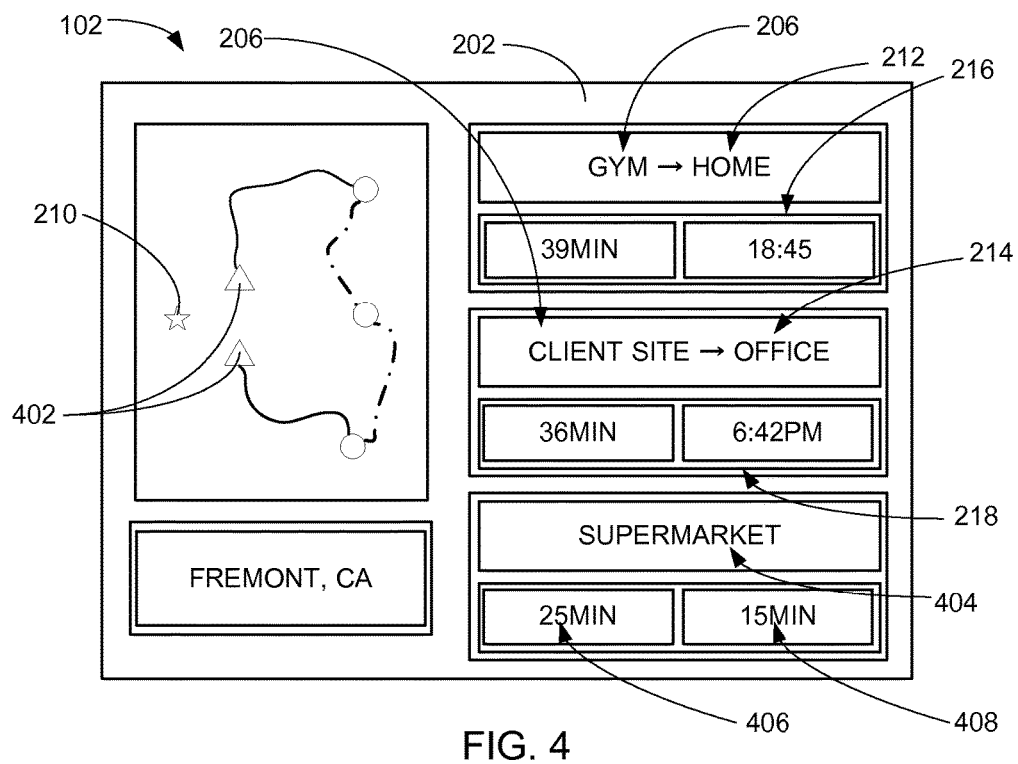
FIG. 4 is a third example of the presentation of the travel information of FIG. 2 displayed on the first device.

Referring now to FIG. 4, therein is shown a third example of the presentation 202 of the travel information 204 of FIG. 2 displayed on the first device 102. The presentation 202 can include the travel information 204 for traveling from multiple designated locations 402 to the destination A 212 and the destination B 214.

The multiple designated locations 402 are defined as the plurality of the designated location 206. For example, the presentation 202 can include the travel information A 216 for traveling from one of the multiple designated locations 402 to the destination A 212. Additionally, the presentation 202 can include the travel information B 218 for traveling from another of the multiple designated locations 402 to the destination B 214. For this example, the designated location 206 and the current location 210 can represent two different geographic locations. More specifically, the user can register the designated location 206 that is different from the current location 210. Details regarding the registration of the designated location 206 will be discussed later.

The presentation 202 can also include the travel information 204 from the destination A 212 or the destination B 214 to a destination C 404, which is defined as the end point for calculating the travel information 204 from one of the target destination 208 of FIG. 2 to another of the target destination 208. For example, the travel information 204 from the destination A 212 to the destination C 404 can represent 25 minutes of a travel time C 406 while the travel information 204 from the destination B 214 to the destination C 404 can represent 15 minutes of a travel time D 408. The travel time C 406 is defined as an estimation of time duration required to travel from the destination A 212 to the destination C 404. The travel time D 408 is defined as an estimation of time duration required to travel from the destination B 214 to the destination C 404.

Figure 5:
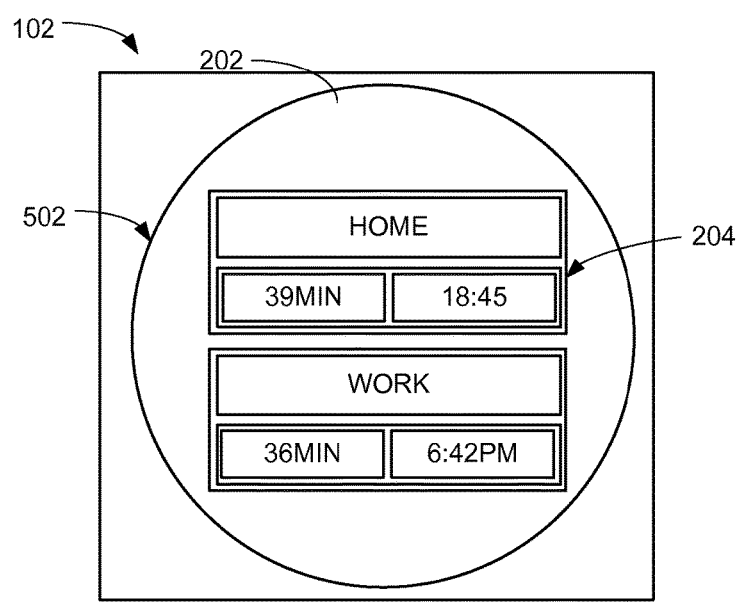
FIG. 5 is a fourth example of the presentation of the travel information of FIG. 2 displayed on the first device.

Referring now to FIG. 5, therein is shown a fourth example of the presentation 202 of the travel information 204 of FIG. 2 displayed on the first device 102. For example, the presentation 202 on the first device 102 can include the presentation 202 displayed as a widget 502, which is defined as a form of the navigation system 100 with reduced functionality for displaying the travel information 204. For example, the widget 502 can represent the navigation system 100 that can only display the travel information 204 for the registered destination 308 of FIG. 3. For another example, the presentation 202 on the widget 502 cannot display the travel route 228 of FIG. 2 to the target destination 208 of FIG. 2. For further example, the user can select the travel information 204 to initiate the audio turn-by-turn navigation.

Figure 6:
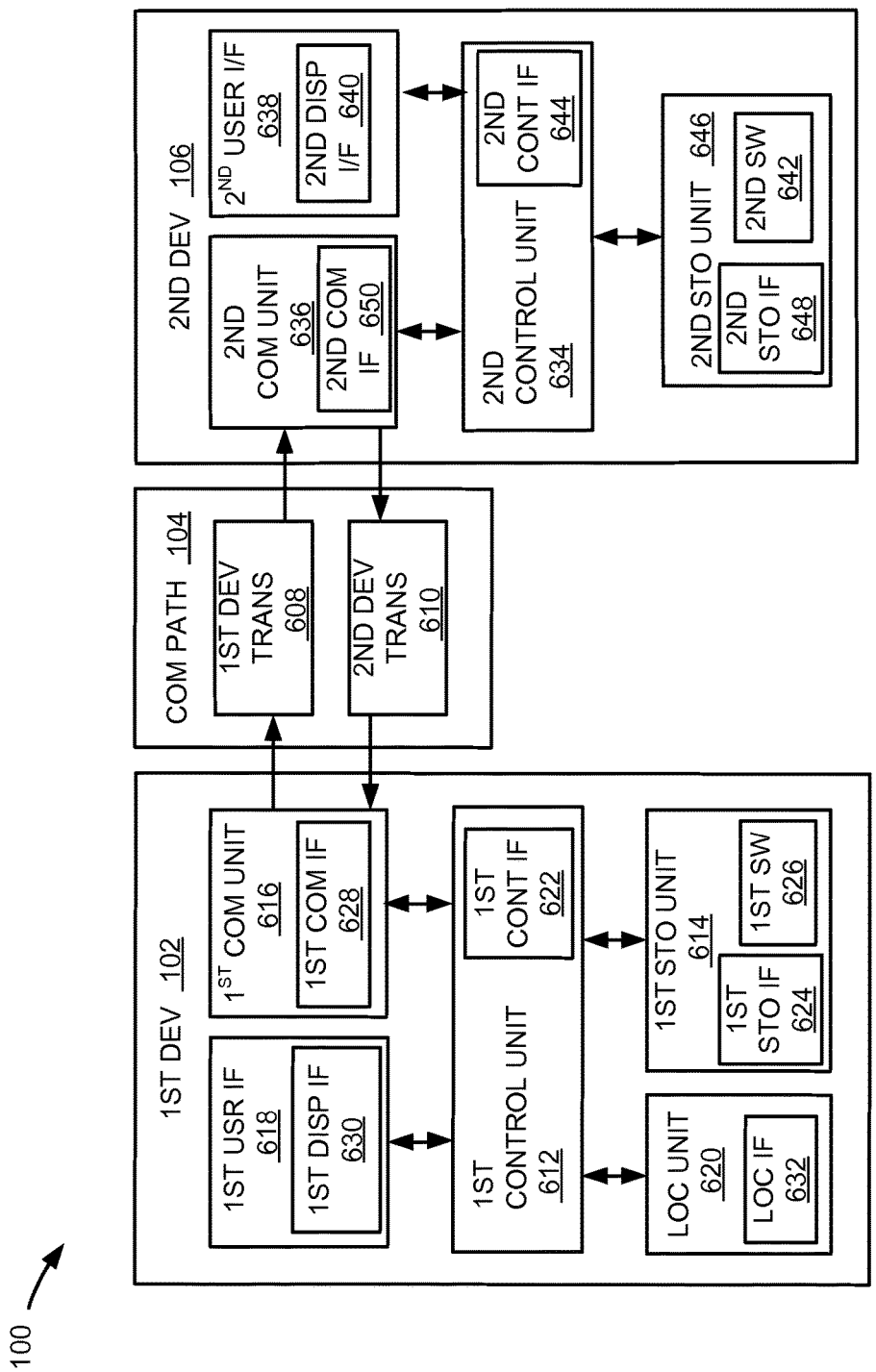
FIG. 6 is an exemplary block diagram of the navigation system.

Referring now to FIG. 6, therein is shown an exemplary block diagram of the navigation system 100. The navigation system 100 can include the first device 102, the communication path 104, and the second device 106. The first device 102 can send information in a first device transmission 608 over the communication path 104 to the second device 106. The second device 106 can send information in a second device transmission 610 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 612, a first storage unit 614, a first communication unit 616, a first user interface 618, and a location unit 620. The first control unit 612 can include a first control interface 622. The first control unit 612 can execute a first software 626 to provide the intelligence of the navigation system 100. The first control unit 612 can be implemented in a number of different manners. For example, the first control unit 612 can be a processor, an embedded processor, a microprocessor, a hardware control logic, a hardware finite state machine (FSM), a digital signal processor (DSP), or a combination thereof. The first control interface 622 can be used for communication between the first control unit 612 and other functional units in the first device 102. The first control interface 622 can also be used for communication that is external to the first device 102.

The first control interface 622 can receive information from the other functional units or from external sources, or can transmit information to the other functional units or to external destinations. The external sources and the external destinations refer to sources and destinations external to the first device 102.

The first control interface 622 can be implemented in different ways and can include different implementations depending on which functional units or external units are being interfaced with the first control interface 622. For example, the first control interface 622 can be implemented with a pressure sensor, an inertial sensor, a microelectromechanical system (MEMS), optical circuitry, waveguides, wireless circuitry, wireline circuitry, or a combination thereof.

The location unit 620 can generate location information, current heading, and current speed of the first device 102, as examples. The location unit 620 can be implemented in many ways. For example, the location unit 620 can function as at least a part of a global positioning system (GPS), an inertial navigation system, a cellular-tower location system, a pressure location system, or any combination thereof.

The location unit 620 can include a location interface 632. The location interface 632 can be used for communication between the location unit 620 and other functional units in the first device 102. The location interface 632 can also be used for communication that is external to the first device 102.

The location interface 632 can receive information from the other functional units or from external sources, or can transmit information to the other functional units or to external destinations. The external sources and the external destinations refer to sources and destinations external to the first device 102.

The location interface 632 can include different implementations depending on which functional units or external units are being interfaced with the location unit 620. The location interface 632 can be implemented with technologies and techniques similar to the implementation of the first control interface 622.

The first storage unit 614 can store the first software 626. The first storage unit 614 can also store the relevant information, such as advertisements, points of interest (POI), navigation routing entries, or any combination thereof.

The first storage unit 614 can be a volatile memory, a nonvolatile memory, an internal memory, an external memory, or a combination thereof. For example, the first storage unit 614 can be a nonvolatile storage such as non-volatile random access memory (NVRAM), Flash memory, disk storage, or a volatile storage such as static random access memory (SRAM).

The first storage unit 614 can include a first storage interface 624. The first storage interface 624 can be used for communication between the location unit 620 and other functional units in the first device 102. The first storage interface 624 can also be used for communication that is external to the first device 102.

The first storage interface 624 can receive information from the other functional units or from external sources, or can transmit information to the other functional units or to external destinations. The external sources and the external destinations refer to sources and destinations external to the first device 102.

The first storage interface 624 can include different implementations depending on which functional units or external units are being interfaced with the first storage unit 614. The first storage interface 624 can be implemented with technologies and techniques similar to the implementation of the first control interface 622.

The first communication unit 616 can enable external communication to and from the first device 102. For example, the first communication unit 616 can permit the first device 102 to communicate with the second device 106 of FIG. 1, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 628. The first communication interface 628 can be used for communication between the first communication unit 616 and other functional units in the first device 102. The first communication interface 628 can receive information from the other functional units or can transmit information to the other functional units.

The first communication interface 628 can include different implementations depending on which functional units are being interfaced with the first communication unit 616. The first communication interface 628 can be implemented with technologies and techniques similar to the implementation of the first control interface 622.

The first user interface 618 allows a user (not shown) to interface and interact with the first device 102. The first user interface 618 can include an input device and an output device. Examples of the input device of the first user interface 618 can include a keypad, a touchpad, soft-keys, a keyboard, a microphone, or any combination thereof to provide data and communication inputs.

The first user interface 618 can include a first display interface 630. The first display interface 630 can include a display, a projector, a video screen, a speaker, or any combination thereof.

The first control unit 612 can operate the first user interface 618 to display information generated by the navigation system 100. The first control unit 612 can also execute the first software 626 for the other functions of the navigation system 100, including receiving location information from the location unit 620. The first control unit 612 can further execute the first software 626 for interaction with the communication path 104 via the first communication unit 616.

The second device 106 can be optimized for implementing the present invention in a multiple device embodiment with the first device 102. The second device 106 can provide the additional or higher performance processing power compared to the first device 102. The second device 106 can include a second control unit 634, a second communication unit 636, and a second user interface 638.

The second user interface 638 allows a user (not shown) to interface and interact with the second device 106. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the navigation system 100. The second software 642 can operate in conjunction with the first software 626. The second control unit 634 can provide additional performance compared to the first control unit 612.

The second control unit 634 can operate the second user interface 638 to display information. The second control unit 634 can also execute the second software 642 for the other functions of the navigation system 100, including operating the second communication unit 636 to communicate with the first device 102 over the communication path 104.

The second control unit 634 can be implemented in a number of different manners. For example, the second control unit 634 can be a processor, an embedded processor, a microprocessor, a hardware control logic, a hardware finite state machine (FSM), a digital signal processor (DSP), or a combination thereof.

The second control unit 634 can include a second controller interface 644. The second controller interface 644 can be used for communication between the second control unit 634 and other functional units in the second device 106. The second controller interface 644 can also be used for communication that is external to the second device 106.

The second controller interface 644 can receive information from the other functional units or from external sources, or can transmit information to the other functional units or to external destinations. The external sources and the external destinations refer to sources and destinations external to the second device 106.

The second controller interface 644 can be implemented in different ways and can include different implementations depending on which functional units or external units are being interfaced with the second controller interface 644. For example, the second controller interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as advertisements, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the navigation system 100 is shown with the second storage unit 646 as a single hierarchy storage system, although it is understood that the navigation system 100 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as non-volatile random access memory (NVRAM), Flash memory, disk storage, or a volatile storage such as static random access memory (SRAM).

The second storage unit 646 can include a second storage interface 648. The second storage interface 648 can be used for communication between the location unit 620 and other functional units in the second device 106. The second storage interface 648 can also be used for communication that is external to the second device 106.

The second storage interface 648 can receive information from the other functional units or from external sources, or can transmit information to the other functional units or to external destinations. The external sources and the external destinations refer to sources and destinations external to the second device 106.

The second storage interface 648 can include different implementations depending on which functional units or external units are being interfaced with the second storage unit 646. The second storage interface 648 can be implemented with technologies and techniques similar to the implementation of the second controller interface 644.

The second communication unit 636 can enable external communication to and from the second device 106. For example, the second communication unit 636 can permit the second device 106 to communicate with the first device 102 over the communication path 104.

The second communication unit 636 can also function as a communication hub allowing the second device 106 to function as part of the communication path 104 and not limited to be an end point or terminal unit to the communication path 104. The second communication unit 636 can include active and passive components, such as microelectronics or an antenna, for interaction with the communication path 104.

The second communication unit 636 can include a second communication interface 650. The second communication interface 650 can be used for communication between the second communication unit 636 and other functional units in the second device 106. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second controller interface 644.

The first communication unit 616 can couple with the communication path 104 to send information to the second device 106 in the first device transmission 608. The second device 106 can receive information in the second communication unit 636 from the first device transmission 608 of the communication path 104.

The second communication unit 636 can couple with the communication path 104 to send information to the first device 102 in the second device transmission 610. The first device 102 can receive information in the first communication unit 616 from the second device transmission 610 of the communication path 104. The navigation system 100 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 106 can include other functional units not shown in FIG. 6 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 620, although it is understood that the second device 106 can also operate the location unit 620.

Figure 7:
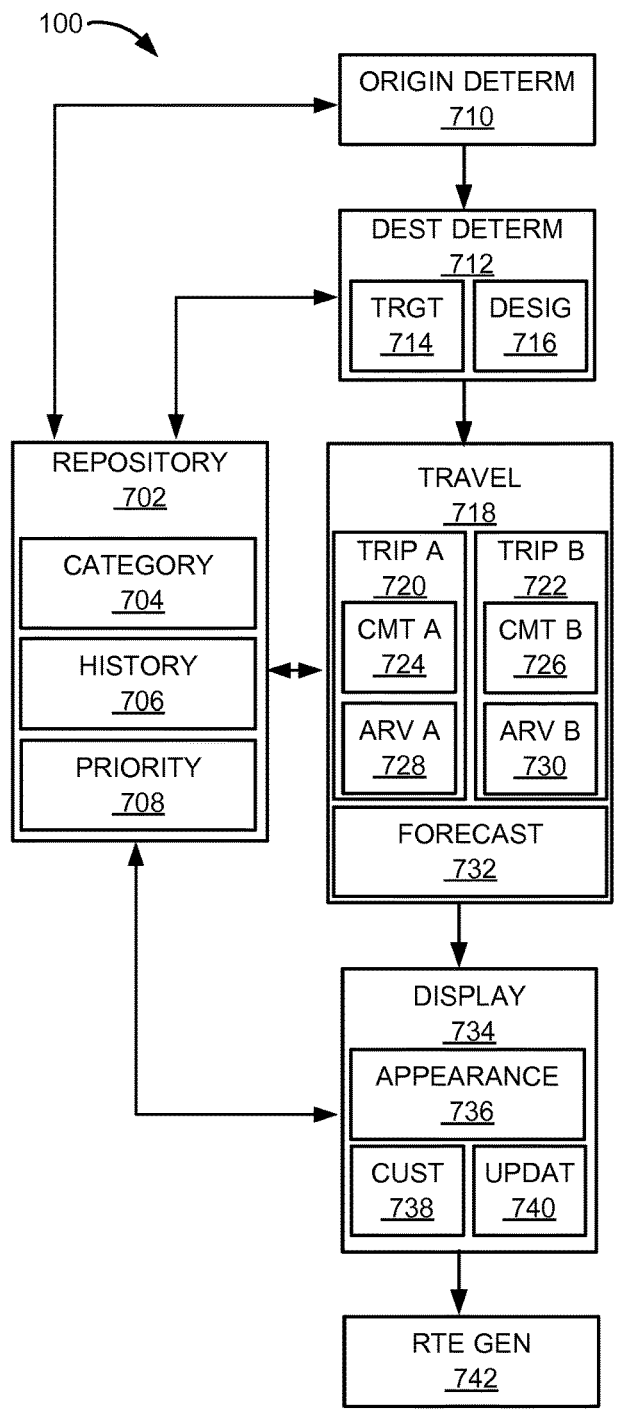
FIG. 7 is a control flow of the navigation system.

Referring now to FIG. 7, therein shown is a control flow of the navigation system 100. The navigation system 100 can include a repository module 702. The repository module 702 provides information that aids the determination of the designated location 206 of FIG. 2 and the target destination 208 of FIG. 2. Furthermore, the repository module 702 also provides information that aids the generation of the travel information 204 of FIG. 2.

The repository module 702 includes a category module 704. The category module 704 can determine the category of interest 302 of FIG. 3 for the designated location 206, the target destination 208, or a combination thereof. For example, if the target destination 208 is Starbucks Coffee™, the category module 704 can determine the category of interest 302 by comparing the address of the target destination 208 to external sources, such as a Yelp™, a search website, via the first control interface 622 of FIG. 6. More specifically, the address of the target destination 208 can be listed on the category of "coffee" within the external sources. As a result, by matching the address of the target destination 208 to the address listed on the external sources, the target destination 208 can represent the category of interest 302 of coffee. The category module 704 can determine the category of interest 302 of the designated location 206 similarly as determined for the target destination 208.

The repository module 702 includes a history module 706. The history module 706 can track the past travel activity of the user with the first device 102 of FIG. 1. For example, the history module 706 can track the travel history 304 by storing the travel information 204 for each time the navigation system 100 is utilized by the user of the first device 102.

For another example, the history module 706 can record the category of interest 302 for each of the target destination 208 traveled to by the user with the first device 102. The history module 706 can also keep track of the designated location 206 of FIG. 2 that the travel information 204 was generated from by identifying the geographic location, such as the current location 210 of FIG. 2, via the location unit 620 of FIG. 6. Furthermore, the history module 706 can keep track of the travel history 304 of FIG. 3 for the time of day, the days of the week, the time of the month, or a combination thereof by storing the target destination 208 reached, the travel route 228 of FIG. 2 traversed, or a combination thereof.

The repository module 702 includes a priority module 708. The priority module 708 can determine the display priority 306 of FIG. 3 for the presentation 202 of FIG. 2 on the first device 102. For example, the priority module 708 can determine the display priority 306 based on the travel history 304. For specific example, the priority module 708 can determine that the target destination 208 that is frequently traveled can have a higher of the display priority 306 than another of the target destination 208 that is less frequently traveled, because higher frequency of travel can indicate higher interest by the user for the travel information 204.

For a different example, the priority module 708 can determine the display priority 306 based on whether the target destination 208 is either the registered destination 308 of FIG. 3 or the unregistered destination 310 of FIG. 3. For specific example, the priority module 708 can determine the registered destination 308 to have the higher of the display priority 306 than the unregistered destination 310, because the registered destination 308 was desired by the user of the navigation system 100 as discussed previously.

For another example, the priority module 708 can determine the display priority 306 based on the travel information 204. For specific example, the priority module 708 can determine that the destination B 214 of FIG. 2 can have a higher of the display priority 306 than the destination A 212 of FIG. 2, because the travel time B 222 of FIG. 2 can be less than the travel time A 220 of FIG. 2. For further example, the priority module 708 can place a higher of the display priority 306 for shorter of duration for traveling, because the user of the navigation system 100 may desire to reach the target destination 208 with the least amount of traveling time.

The navigation system 100 can include an origin determinator module 710, which can be coupled to the repository module 702. The origin determinator module 710 determines the starting geographic location for the navigation system 100 for generating the travel information 204. For example, the origin determinator module 710 can determine the designated location 206.

The origin determinator module 710 can determine the designated location 206 in a number of ways. For example, the origin determinator module 710 can determine the designated location 206 as the current location 210 via the location unit 620. For another example, the user of the navigation system 100 can register the designated location 206 by entering a specific address into the first device 102. The origin determinator module 710 can determine the designated location 206 to be the geographic location registered.

For a different example, the origin determinator module 710 can estimate the designated location 206 by the travel history 304 provided by the history module 706. For example, around Monday noon, the user of the navigation system 100 historically is at his office before going out for lunch. The origin determinator module 710 can determine the designated location 206 to be the user's office address around every Monday noon.

For a different example, the origin determinator module 710 can determine the multiple designated locations 402 of FIG. 4. For example, on Tuesday evenings, the travel history 304 can indicate that the user with the first device 102 can be at the gym. However, the user with the first device 102 can still be at the office. The origin determinator module 710 can determine the multiple designated locations 402 to be the current location 210 of the office and the gym based on the travel history 304. For another example, there can be three registered geographic locations for the multiple designated locations 402. The origin determinator module 710 can determine the multiple designated locations 402 to be each of the three geographic locations.

The navigation system 100 can include a destination determinator module 712, which can be coupled to the origin determinator module 710. The destination determinator module 712 determines the ending geographic location for the navigation system 100 for generating the travel information 204. For example, the destination determinator module 712 can determine the target destination 208.

The destination determinator module 712 includes a target module 714, which can determine the target destination 208. The target module 714 can determine the target destination 208 in a number of ways. For example, the target module 714 can determine the registered destination 308 by the user of the navigation system 100 registering the geographic location as the target destination 208 to the navigation system 100.

The target module 714 can determine the unregistered destination 310. For example, the target module 714 can determine the unregistered destination 310 based on the travel history 304 provided by the history module 706. More specifically, the travel history 304 indicates that the user with the first device 102 can go shopping for groceries after work around 7 PM every Thursdays. The travel history 304 can also indicate that the grocery store can be Whole Foods Market™, an American brand organic grocery store. When the user leaves work around 7 PM on Thursdays, the target module 714 can determine the unregistered destination 310 to be Whole Foods Market™.

For another example, the target module 714 can determine the unregistered destination 310 based on the category of interest 302 provided by the category module 704. For example, the registered destination 308 can represent Starbucks Coffee™ with the category of interest 302 of coffee. Based on the category of interest 302 of the registered destination 308, the target module 714 can determine the unregistered destination 310 of Peet's Coffee™ with the also the category of interest 302 of coffee for suggesting the target destination 208 alternative to the registered destination 308.

The destination determinator module 712 includes a designator module 716. The designator module 716 can designate the target destination 208 as the destination A 212, the destination B 214, or the destination C 404 of FIG. 4. For example, if there are multiple numbers of the target destination 208, the designator module 716 can designate each of the multiple numbers of the target destination 208 to be the destination A 212 or the destination B 214. The designation of the target destination 208 as the destination A 212 or the destination B 214 can base on the display priority 306. For example, the display priority 306 can prioritize the display of the target destination 208 with the shortest distance from the designated location 206 as the destination A 212. For another example, the designator module 716 can designate the target destination 208 as the destination A 212 or the destination B 214 randomly.

For a different example, the designator module 716 can designate the target destination 208 based on the travel history 304. For specific example, on Wednesday nights, the user of the navigation system 100 can take golf lessons at the golfing range near his office before going home. Subsequently, the designator module 716 can designate the golfing range as the destination A 212 and home as the destination B 214, because the display priority 306 of the travel information A 216 of FIG. 2 may be higher than the travel information B 218 of FIG. 2 based on the travel history 304.

The navigation system 100 can include a travel module 718, which can be coupled to the destination determinator module 712. The travel module 718 generates the travel information 204. The travel module 718 includes a trip A module 720 and a trip B module 722 for generating the travel information 204. For example, the trip A module 720 can generate the travel information A 216 from traveling from the designated location 206 to the destination A 212. For another example, the trip B module 722 can generate the travel information B 218 from traveling from the designated location 206 to the destination B 214. For a different example, the trip A module 720, the trip B module 722, or a combination thereof can generate the unrequested travel information 312 of FIG. 3 for traveling from the designated location 206 to the unregistered destination 310. The trip A module 720 and the trip B module 722 can generate the unrequested travel information 312 similarly as to the generation of the travel information 204.

The travel module 718 can generate the travel information 204 in a number of ways. The trip A module 720 includes a commute A module 724 and the trip B module 722 includes a commute B module 726. The commute A module 724 and the commute B module 726 calculates the time required for traveling from the designated location 206 to the target destination 208. For example, the commute A module 724 can calculate the travel time A 220 for traveling from the designated location 206 to the destination A 212. For another example, the commute B module 726 can calculate the travel time B 222 for traveling from the designated location 206 to the destination B 214.

For brevity, the detail will focus on the commute A module 724 calculating the travel time A 220. However, the travel time B 222 can be calculated by the commute B module 726 similarly as the calculation of the travel time A 220. Furthermore, the commute A module 724 and the commute B module 726 can calculate the time required to travel from the designated location 206 to the registered destination 308 or the unregistered destination 310 similarly as the calculation of the travel time A 220.

For example, the commute A module 724 can calculate the travel time A 220 by considering a traffic condition between the designated location 206 to the target destination 208. The commute A module 724 can receive the information related to the traffic condition from external sources, such as 511.org, a traffic information website, via the first control interface 622. The commute A module 724 can factor the speed of traffic and the distance between the designated location 206 and the target destination 208 for calculating the travel time A 220.

The travel module 718 includes an arrival A module 728 and an arrival B module 730. The arrival A module 728 and the arrival B module 730 calculates the estimation of when the user with the first device 102 can arrive at the target destination 208. For example, the arrival A module 728 can calculate the estimated arrival time A 224 for traveling from the designated location 206 to the destination A 212. For another example, the arrival B module 730 can calculate the estimated arrival time B 226 for traveling from the designated location 206 to the destination B 214.

For brevity, the detail will focus on the arrival A module 728 calculating the estimated arrival time A 224. However, the estimated arrival time B 226 can be calculated by arrival B module 730 similarly as the calculation of the estimated arrival time B 226. Furthermore, the arrival A module 728 and the arrival B module 730 can calculate the estimation of when the user with the first device 102 can arrive at the registered destination 308 or the unregistered destination 310 similarly as the calculation of the estimated arrival time A 224.

For example, the arrival A module 728 can calculate the estimated arrival time A 224 by considering the traffic condition between the designated location 206 to the target destination 208. The arrival A module 728 can receive the information related to the traffic condition from external sources via the first control interface 622. The arrival A module 728 can factor the speed of traffic and the distance between the designated location 206 and the target destination 208 for calculating the estimated arrival time A 224.

The travel module 718 includes a forecast module 732. The forecast module 732 forecasts the travel information 204 to the target destination 208. For example, the forecast module 732 can forecast the travel information 204 based on extrapolating from the travel history 304. For another example, the forecast module can forecast the travel information A 216 and the travel information B 218 based on extrapolating the travel history 304 for reaching the destination A 212 and the destination B 214.

The forecast module 732 can forecast the travel information 204 in a number of ways. For example, the travel history 304 can indicate that the travel time A 220 from the designated location 206 representing the gym to the destination A 212 representing the user's home can be 40 minutes on Monday evenings during the months of June until August. The travel history 304 can also indicate that the travel time A 220 from the designated location 206 representing the gym to the destination A 212 representing the user's home can be 60 minutes on Monday evenings during the months of September until December. The forecast module 732 can forecast the travel time A 220 to be 40 minutes during the summer and 60 minutes during fall.

For another example, the forecast module 732 can forecast the travel information 204 for each day of the week. Similarly to a weather report, the forecast module 732 can forecast the travel information 204 for each day of the week based on the travel history 304 from the user's driving history, the past traffic condition along the route between the designated location 206 and the target destination 208, or a combination thereof.

The navigation system 100 can include a display module 734, which can be coupled to the travel module 718. The display module 734 presents the presentation 202 of the travel information 204 on the first device 102. For example, the display module 734 can present the travel information A 216 and the travel information B 218 concurrently for displaying on the first device 102.

The display module 734 can present the presentation 202 of the travel information 204 in a number of ways. The display module 734 includes an appearance module 736. The appearance module 736 displays the presentation 202 of the travel information 204 on the first device 102.

For example, the appearance module 736 can present the travel information A 216 and the travel information B 218 concurrently for displaying on the first device 102. As illustrated in FIG. 2, the first device 102 can display the travel information A 216 to the destination A 212 and the travel information B 218 to the destination B 214 from the current location 210.

For further example, the appearance module 736 can present the travel time A 220 and the travel time B 222 concurrently for displaying on the first device 102. As illustrated in FIG. 2, the first device 102 can display the travel time A 220 to the destination A 212 and the travel time B 222 to the destination B 214 from the designated location 206.

For another example, the appearance module 736 can present the estimated arrival time A 224 and the estimated arrival time B 226 concurrently for displaying on the first device 102. As illustrated in FIG. 2, the first device 102 can display the estimated arrival time A 224 to the destination A 212 and the estimated arrival time B 226 to the destination B 214 from the designated location 206.

It has been discovered that the present invention provides the navigation system 100 the ability to provide the travel information A 216 and the travel information B 218 concurrently for the presentation 202 on the first device 102 improves the efficiency and the use of the present invention. By having the travel time A 220 and the travel time B 222 displayed concurrently, the user of the navigation system 100 can quickly discern the traffic condition from the designated location 206 to the destination A 212 and the destination B 214. Furthermore, by having the estimated arrival time A 224 and the estimated arrival time B 226 displayed concurrently, the user can improve the efficiency for planning for the travel to the destination A 212 or the destination B 214. The availability of the travel information 204 to multiple geographic location reduces distraction from searching for such information, thus, improving the safety for the operation of the navigation system 100.

The display module 734 includes a customization module 738. The customization module 738 customizes the presentation 202 of the travel information 204 on the first device 102. For example, the customization module 738 can change the presentation 202 for customizing the travel information 204 displayed on the first device 102.

The customization module 738 can customize the presentation 202 in a number of ways. For example, the customization module 738 can customize the presentation 202 by displaying the travel information 204 to the registered destination 308 only, the unregistered destination 310 only, or the combination of the registered destination 308 and the unregistered destination 310. For further example, the customization module 738 can customize the presentation 202 by presenting the unrequested travel information 312 to the unregistered destination 310 concurrently with the travel information A 216 and the travel information B 218 for displaying on the first device 102.

For a different example, the customization module 738 can customize the presentation 202 by changing the presentation 202 based on the travel history 304. More specifically, the user of the navigation system 100 frequents Chinese food for lunch on Fridays. The customization module 738 can customize the presentation 202 by presenting only the travel information 204 to the target destination 208 representing Chinese restaurants for around lunchtime on Fridays.

For another example, the customization module 738 can customize the presentation 202 by presenting the travel information 204 based on the category of interest 302 for displaying concurrently on the first device 102 for the target destination 208 for sharing the category of interest 302. As discussed previously, the registered destination 308 can be Starbucks Coffee™ with the category of interest 302 of coffee. The customization module 738 can customize the presentation 202 by including only the unregistered destination 310 having the category of interest 302 of coffee in the presentation 202 and excluding the unregistered destination 310 with the category of interest 302 that is not coffee.

For another example, the customization module 738 can customize the presentation 202 by presenting the travel information 204 based on the display priority 306. As discussed previously, the customization module 738 can customize the presentation 202 by presenting the travel information 204 to the registered destination 308 and exclude the travel information 204 to the unregistered destination 310, because the display priority 306 for the registered destination 308 can be higher.

For different example, the customization module 738 can customize the presentation 202 based on the display priority 306 by increasing the font size, changing the color, or a combination thereof for the target destination 208 with the higher of the display priority 306. As illustrated in FIG. 3, the travel time A 220 can be shorter than the travel time B 222. The priority module 708 can place the shorter of the duration of time for traveling with higher of the display priority 306. As a result, the presentation 202 of the travel time A 220 can be displayed with a bigger font.

For another example, the customization module 738 can customize the presentation 202 by presenting the travel information 204 on the widget 502 of FIG. 5. By changing the presentation 202 of the travel information 204 to be displayed on the widget 502, the customization module 738 can present only the travel information 204 for the registered destination 308 and exclude the unrequested travel information 312 to focus on information desired by the user.

It has been discovered that the present invention provides the navigation system 100 with the ability to customize the presentation 202 of the travel information 204 displayed on the first device 102. The ability to customize the presentation 202 improves the safety of the operation of the navigation system 100 by excluding the unrequested travel information 312 not desired by the user. Further, the ability to customize the presentation 202 based on the category of interest 302, the travel history 304, the display priority 306, or a combination thereof improves the quality of the content of the presentation 202 by displaying the travel information 204 most desired and relevant to the user. As a result, the reduction of distraction and improvement of the content leads to safer operation of the navigation system 100.

The display module 734 includes an update module 740. The update module 740 updates the travel information 204. For example, the update module 740 can update the travel information A 216 and the travel information B 218 based on the current location 210 changed for presenting concurrently on the first device 102.

The change in the current location 210 can be detected via the location unit 620. As a result, the update module 740 can update the travel information 204 in real-time based on the changes of the geographic location of the designated location 206. More specifically, the destination A 212 and the destination B 214 can be at opposite direction from the current location 210. As the user with the first device 102 travels toward the destination B 214, the travel time B 222 can decrease while the travel time A 220 can increase in real-time.

The navigation system 100 can include a route generator module 742, which can be coupled to the display module 734. The route generator module 742 generates the travel route 228 of FIG. 2. For example, the route generator module 742 can generate the travel route 228 to either the destination A 212 if the travel information A 216 is selected or the destination B 214 if the travel information B 218 is selected for displaying on the first device 102.

For a different example, the route generator module 742 can generate multiple numbers of the travel route 228. For example, the presentation 202 can include the travel route 228 to the destination A 212 and the travel route 228 to the destination B 214.

More specifically, the user of the navigation system 100 can directly select the presentation 202 of the travel information 204 on the first device 102. For example, the user can select the travel information A 216 or the travel information B 218 displayed on the first device 102. Based on the selection, the route generator module 742 can generate the travel route 228 to the target destination 208 selected. Furthermore, the route generator module 742 can generate a turn-by-turn navigation guidance to the target destination 208 based on the selection.

The physical transformation from traveling along the travel route 228 result in the movement in the physical world, such as people using the first device 102, the vehicle, or a combination thereof. As the movement in the physical world occurs, the movement itself creates additional information for the traffic information 230 of FIG. 2 that is converted back for updating the travel time A 220, the travel time B 222, the estimated arrival time A 224, and the estimated arrival time B 226 and for the continued operation of the navigation system 100 and to continue the movement in the physical world.

The first software 626 of FIG. 6 of the first device 102 of FIG. 6 can include the navigation system 100. For example, the first software 626 can include the repository module 702, the origin determinator module 710, the destination determinator module 712, the travel module 718, the display module 734, and the route generator module 742.

The first control unit 612 of FIG. 6 can execute the first software 626 for the repository module 702 for providing the category of interest 302, the travel history 304, the display priority 306, or a combination thereof. The first control unit 612 can execute the first software 626 for the origin determinator module 710 for determining the designated location 206.

The first control unit 612 can execute the first software 626 for the destination determinator module 712 for determining the target destination 208. The first control unit 612 can execute the first software 626 for the travel module 718 for generating the travel information 204.

The first control unit 612 can execute the first software 626 for the display module 734 for presenting the travel information A 216 and the travel information B 218 concurrently on the first device 102. The first control unit 612 can execute the first software 626 for the route generator module 742 for generating the travel route 228.

The second software 642 of FIG. 6 of the second device 106 of FIG. 6 can include the navigation system 100. For example, the second software 642 can include the repository module 702, the origin determinator module 710, the destination determinator module 712, the travel module 718, the display module 734, and the route generator module 742.

The second control unit 634 of FIG. 6 can execute the second software 642 for the repository module 702 for providing the category of interest 302, the travel history 304, the display priority 306, or a combination thereof. The second control unit 634 can execute the second software 642 for the origin determinator module 710 for determining the designated location 206.

The second control unit 634 can execute the second software 642 for the destination determinator module 712 for determining the target destination 208. The second control unit 634 can execute the second software 642 for the travel module 718 for generating the travel information 204.

The second control unit 634 can execute the second software 642 for the display module 734 for presenting the travel information A 216 and the travel information B 218 concurrently on the first device 102. The second control unit 634 can execute the second software 642 for the route generator module 742 for generating the travel route 228.

The navigation system 100 can be partitioned between the first software 626 and the second software 642. For example, the second software 642 can include the origin determinator module 710, the destination determinator module 712, the travel module 718, the display module 734, and the route generator module 742. The second control unit 634 can execute modules partitioned on the second software 642 as previously described.

The first software 626 can include the repository module 702. Based on the size of the first storage unit 614 of FIG. 6, the first software 626 can include additional modules of the navigation system 100. The first control unit 612 can execute the modules partitioned on the first software 626 as previously described.

The first user interface 618 of FIG. 6 can receive registration of the designated location 206, the target destination 208, or a combination thereof. The first user interface 618 can also receive the selection of the travel information 204 by the user. The first control unit 612 can operate the first communication unit 616 to send the travel history 304, the category of interest 302, the display priority 306 to the second device 106. The first control unit 612 can operate the first software 626 to operate the location unit 620.

The second communication unit 636 of FIG. 6 can send the travel route 228 and the travel information 204 to the first device 102 through the communication path 104 of FIG. 6. The travel information A 216, the travel information B 218, and the travel route 228 can be displayed concurrently on the first display interface 630 and the second device 106.

The navigation system 100 describes the module functions or order as an example. The modules can be partitioned differently. For example, the origin determinator module 710 and the destination determinator module 712 can be combined. Each of the modules can operate individually and independently of the other modules.

Furthermore, data generated in one module can be used by another module without being directly coupled to each other. For example, the travel module 718 can receive the designated location 206 from the origin determinator module 710. The repository module 702, the origin determinator module 710, the destination determinator module 712, the travel module 718, the display module 734, and the route generator module 742 can be implemented in as hardware (not shown) within the first control unit 612, the second control unit 634, or special hardware (not shown) in the first device 102 or the second device 106.

Figure 8:
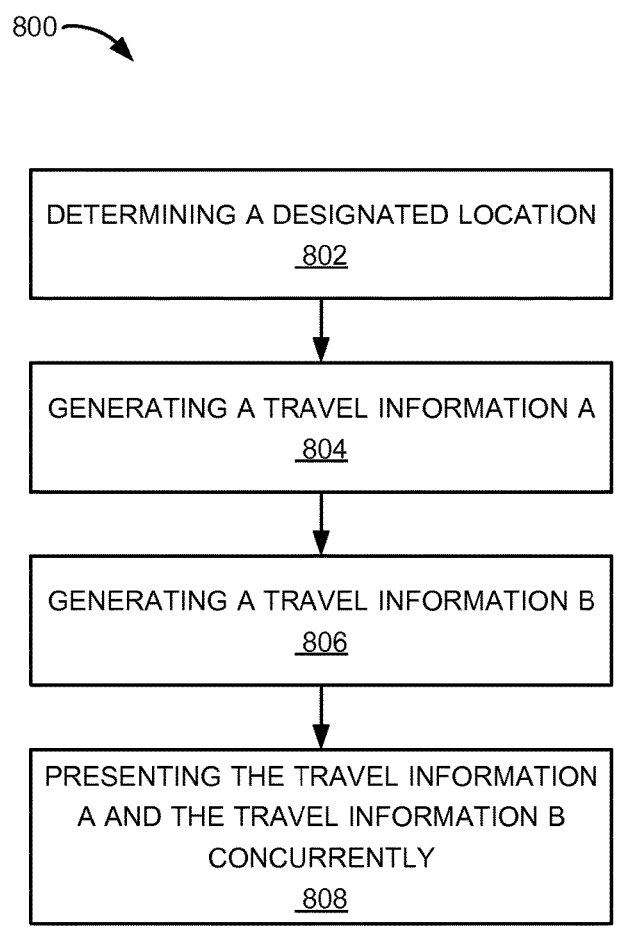
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The method 800 includes: determining a designated location for estimating travel information in a block 802; generating a travel information A for traveling from the designated location to a destination A in a block 804; generating a travel information B for traveling from the designated location to a destination B in a block 806; and presenting the travel information A and the travel information B concurrently based on a display priority for displaying on a device in a block 808.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   estimating multiple designated locations and multiple target destinations for traveling at a specific timeframe between one of the designated locations and one of the target destinations based on a travel history with a control unit;
   generating travel information A for traveling from a first one of the designated locations to a first one of the target destinations representing a destination A;
   generating travel information B for traveling from a second one of the designated locations to a second one of the target destinations representing a destination B;
   determining a display priority, representing a shortest travel time having a higher priority, based on comparing the travel information A and the travel information B for prioritizing a presentation of the travel information A over the travel information B or vice versa; and
   presenting each of the travel information A and the travel information B concurrently in order wherein the travel information including a travel time with a higher instance of the display priority is displayed above the travel information including the travel time with a lower instance of the display priority on a display interface of a device.

2. The method as claimed in claim 1 further comprising changing the presentation for customizing travel information displayed on the device.

3. The method as claimed in claim 1 wherein presenting the travel information A and the travel information B includes presenting unrequested travel information to an unregistered destination concurrently with the travel information A and the travel information B for displaying on the device.

4. The method as claimed in claim 1 further comprising forecasting each of the travel information A and the travel information B based on extrapolation of the travel history.

5. The method as claimed in claim 1 wherein presenting each of the travel information A and the travel information B includes presenting each of the travel information A and the travel information B based on a category of interest for displaying concurrently on the device for a destination sharing the category of interest.

6. A method of operation of a navigation system comprising:
   estimating multiple designated locations and multiple target destinations for traveling at a specific timeframe between one of the designated locations and one of the target destinations based on a travel history with a control unit;
   generating travel information A for traveling from a first one of the designated locations to a first one of the target destinations representing a destination A;

generating travel information B for traveling from a second one of the designated locations to a second one of the target destinations representing a destination B;

determining a display priority, representing a shortest travel time having a higher priority, based on comparing the travel information A and the travel information B to prioritize a presentation of the travel information A over the travel information B or vice versa;

presenting each of the travel information A and the travel information B concurrently in order wherein the travel information including a travel time with a higher instance of the display priority is displayed above the travel information including the travel time with a lower instance of the display priority on a display interface of a device; and generating a travel route to the destination A, the destination B, or a combination thereof for displaying on the device.

7. The method as claimed in claim 6 wherein:

generating the travel information A includes calculating a travel time A for traveling from the first one of the designated locations to the first one of the target destinations representing the destination A;

generating the travel information B includes calculating a travel time B for traveling from the second one of the designated locations to the second one of the target destinations representing the destination B; and presenting the travel information A and the travel information B includes presenting the travel time A and the travel time B concurrently for displaying on the device.

8. The method as claimed in claim 6 wherein:

generating the travel information A includes calculating an estimated arrival time A for traveling from the first one of the designated locations to the first one of the target destinations representing the destination A;

generating the travel information B includes calculating an estimated arrival time B for traveling from the second one of the designated locations to the second one of the target destinations representing the destination B; and presenting the travel information A and the travel information B includes presenting the estimated arrival time A and the estimated arrival time B concurrently for displaying on the device.

9. The method as claimed in claim 6 wherein:

determining each of the first and second designated locations includes determining a current location; and further comprising:

updating the travel information A and the travel information B based on changing each of the first and second designated locations representing the current location changed for presenting concurrently on the device.

10. The method as claimed in claim 6 wherein:

estimating the multiple designated locations includes determining the multiple designated locations.

11. A navigation system comprising:

a control unit configured to:

estimate multiple designated locations and multiple target destinations for traveling at a specific timeframe between one of the designated locations and one of the target destinations based on a travel history, generate travel information A for traveling from a first one of the designated locations to a first one of the target destinations representing a destination A, generate travel information B for traveling from a second one of the designated locations to a second one of the target destinations representing a destination B, determine a display priority, representing a shortest travel time having a higher priority, based on comparing the travel information A and the travel information B to prioritize a presentation of the travel information A over the travel information B or vice versa, and a communication interface, coupled to the control unit, configured to present each of the travel information A and the travel information B concurrently in order wherein the travel information including a travel time with a higher instance of the display priority is displayed above the travel information including the travel time with a lower instance of the display priority on a display interface of a device.

12. The navigation system as claimed in claim 11 wherein the control unit is further configured to change the presentation for customizing travel information displayed on the device.

13. The navigation system as claimed in claim 11 wherein the control unit is further configured to present unrequested travel information to an unregistered destination concurrently with the travel information A and the travel information B for displaying on the device.

14. The navigation system as claimed in claim 11 wherein the control unit is further configured to forecast travel information based on extrapolation of the travel history.

15. The navigation system as claimed in claim 11 wherein the control unit is further configured to present travel information based on a category of interest for displaying concurrently on the device for a destination sharing the category of interest.

16. The navigation system as claimed in claim 11 wherein the control unit is further configured to generate a travel route to the destination A, the destination B, or a combination thereof for displaying on the device.

17. The navigation system as claimed in claim 16 wherein the control unit is further configured to:

calculate a travel time A for traveling from the first one of the designated locations to the first one of the target destinations representing the destination A;

calculate a travel time B for traveling from the second one of the designated locations to the second one of the target destinations representing the destination B; and present the travel time A and the travel time B concurrently for displaying on the device.

18. The navigation system as claimed in claim 16 wherein the control unit is further configured to:

calculate an estimated arrival time A for traveling from the first one of the designated locations to the first one of the target destinations representing the destination A;

calculate an estimated arrival time B for traveling from the second one of the designated locations to the second one of the target destinations representing the destination B; and present the estimated arrival time A and the estimated arrival time B concurrently for displaying on the device.

19. The navigation system as claimed in claim 16 wherein the control unit is further configured to:

determine a current location; and update each of the travel information A and the travel information B based on changing each of the first and second designated locations representing the current location changed for presenting concurrently on the device.

20. The navigation system as claimed in claim 16 wherein estimating the multiple designated locations further comprises determining the multiple designated locations.

* * * * *